United States Patent [19]

Koch et al.

[11] Patent Number: 5,529,669

[45] Date of Patent: Jun. 25, 1996

[54] APPARATUS AND PROCESS FOR THE PREPARATION OF HYDROGEN CYANIDE

[75] Inventors: Theodore A. Koch; Karl R. Krause; Mehrdad Mehdizadeh, all of Wilmington, Del.

[73] Assignee: E. I. Du Pont de Nemours and Company, Wilmington, Del.

[21] Appl. No.: 468,392

[22] Filed: Jun. 6, 1995

Related U.S. Application Data

[62] Division of Ser. No. 174,525, Dec. 28, 1993, Pat. No. 5,470,541.

[51] Int. Cl.⁶ ..................................................... C01B 3/00
[52] U.S. Cl. ..................................... 204/157.43; 423/645
[58] Field of Search ....................... 422/186; 204/157.43; 423/645

[56] References Cited

U.S. PATENT DOCUMENTS 5,393,393  2/1995  Wan et al. ......................... 204/157.43

Primary Examiner—Donald P. Walsh
Assistant Examiner—Daniel J. Jenkins

[57] ABSTRACT

An apparatus and process for production of HCN from ammonia and a hydrocarbon gas by the use of microwave energy using a single mode microwave reactor.

10 Claims, 2 Drawing Sheets

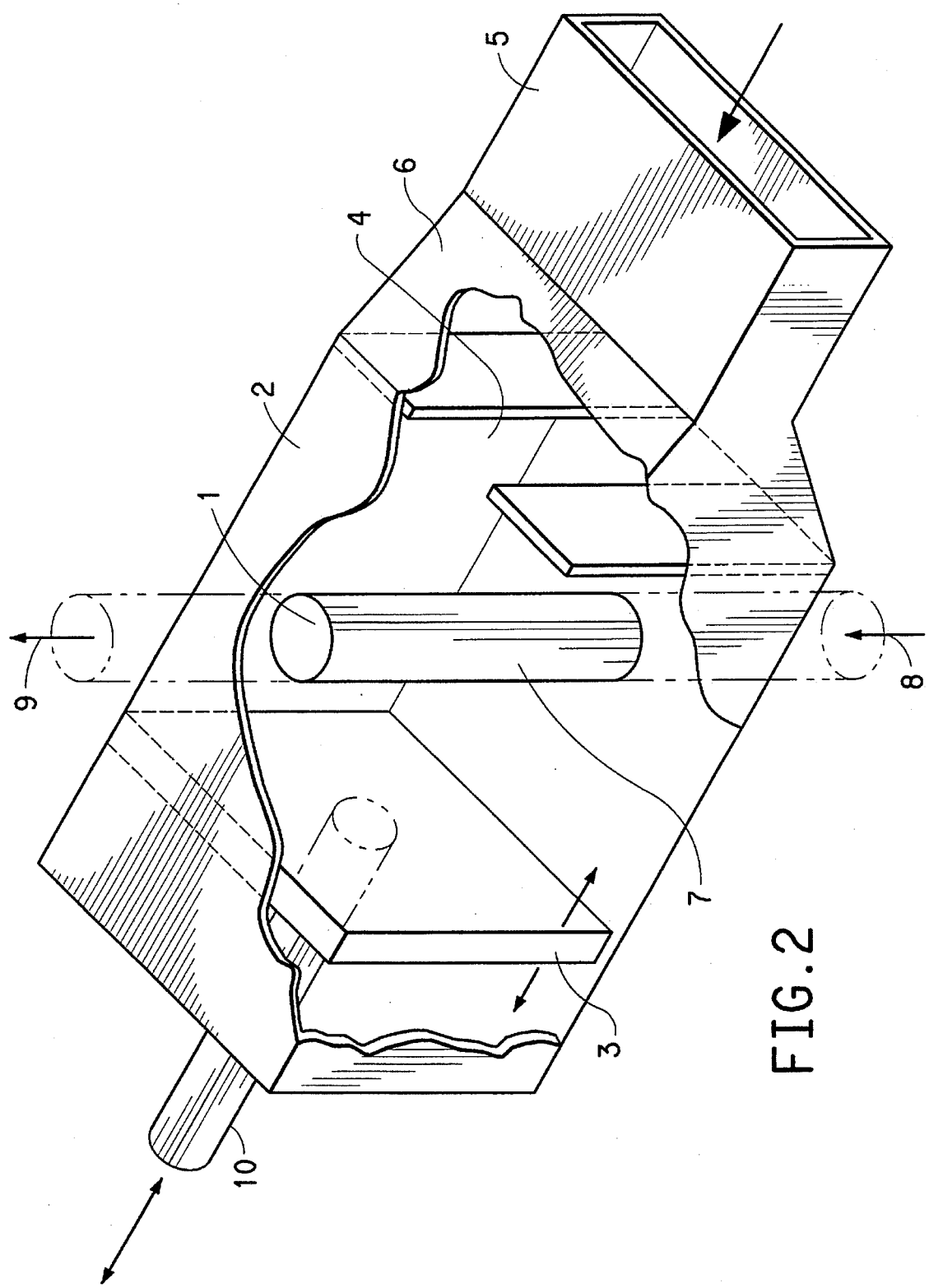

APPARATUS AND PROCESS FOR THE PREPARATION OF HYDROGEN CYANIDE

This is a division of application Ser. No. 08/174,525, filed Dec. 28, 1993 now U.S. Pat. No. 5,470,541.

FIELD OF THE INVENTION

This invention relates to the preparation of hydrogen cyanide (HCN) by reacting ammonia and a hydrocarbon gas at a pressure at least equal to atmospheric pressure in the presence of a platinum-group-metal catalyst while heating the catalyst by single mode microwave heating, and to an apparatus useful in carrying out this process.

BACKGROUND OF THE INVENTION

Hydrogen cyanide is highly toxic, but a commercially important chemical compound having a wide variety of industrial uses. Hydrogen cyanide is produced commercially by contacting ammonia excess hydrocarbon gas, and an oxidizing gas with a platinum-group-metal catalyst. The excess hydrocarbon gas is ignited, and the heat generated is sufficient to cause the endothermic reaction of ammonia and the remaining hydrocarbon gas to form hydrogen cyanide.

Shipment of hydrogen cyanide presents potential hazards. One way to avoid these potential hazards is to produce the product at the site where it is to be used. However this requires the installation of a large number of small production facilities. Such production facilities have in the past been expensive.

It is an objective of the present invention to provide a process for the production of HCN that can be operated on a relatively small scale but efficiently and at low a installation cost.

The present invention employs the use of single mode microwave heating of a platinum-group-metal catalyst to cause ammonia to react with hydrocarbon gas and form hydrogen cyanide. The reaction is endothermic, and by the use of microwave heating the amount of energy used may be carefully regulated so that a minimum of energy is wasted.

A single mode microwave cavity is a metallic chamber, where at least two of the three dimensions are approximately half the microwave operating wavelength. The cavity then produces a "standing wave", where intense electric fields are produced. These fields are usually in the center of the cavity.

The use of microwave energy without interaction with a solid catalyst to produce HCN from ammonia and methane at pressures of 10 to 25 torr is disclosed in a thesis titled "Chemical Physics in a Microwave Plasma—Production of HCN." by Thorkild Juul-Dam, University of Texas at Austin, June 1942.

SUMMARY OF THE INVENTION

The present invention is a process for the preparation of hydrogen cyanide which comprises passing a mixture of ammonia vapor and a hydrocarbon gas having 1 to 6 carbon atoms at a pressure at least equal to atmospheric pressure in contact with a platinum-group-metal catalyst containing 0.1 to 20% by weight platinum-group metal, while subjecting the catalyst to single mode microwave heating to raise the temperature of the catalyst to reaction temperature, and recovering hydrogen cyanide.

The present invention is also a product generator comprising:

a microwave power source;

a waveguide coupled to said power source for transmitting microwave radiation therethrough; said waveguide having a flared section;

a resonant cavity attached to the flared section of said waveguide, said resonant cavity having a movable wall opposite the side of the cavity to which the waveguide is attached for tuning the resonant cavity and for focusing microwave radiation on a tubular reactor;

a tubular reactor extending through said resonant cavity intermediate between the side of the cavity to which the waveguide is attached and the movable wall, in a direction parallel to the movable wall, said tubular reactor having inlet means for introducing gas and outlet means for removing product, the portion of the tubular reactor inside the resonant cavity being adapted to contain a catalyst.

DESCRIPTION OF THE DRAWINGS

FIG. 2 is a perspective view of a product generator suitable for use in the production of HCN from ammonia and a hydrocarbon gas using microwave energy.

DETAILED DESCRIPTION

I. Definitions and Basics

Figure 1:
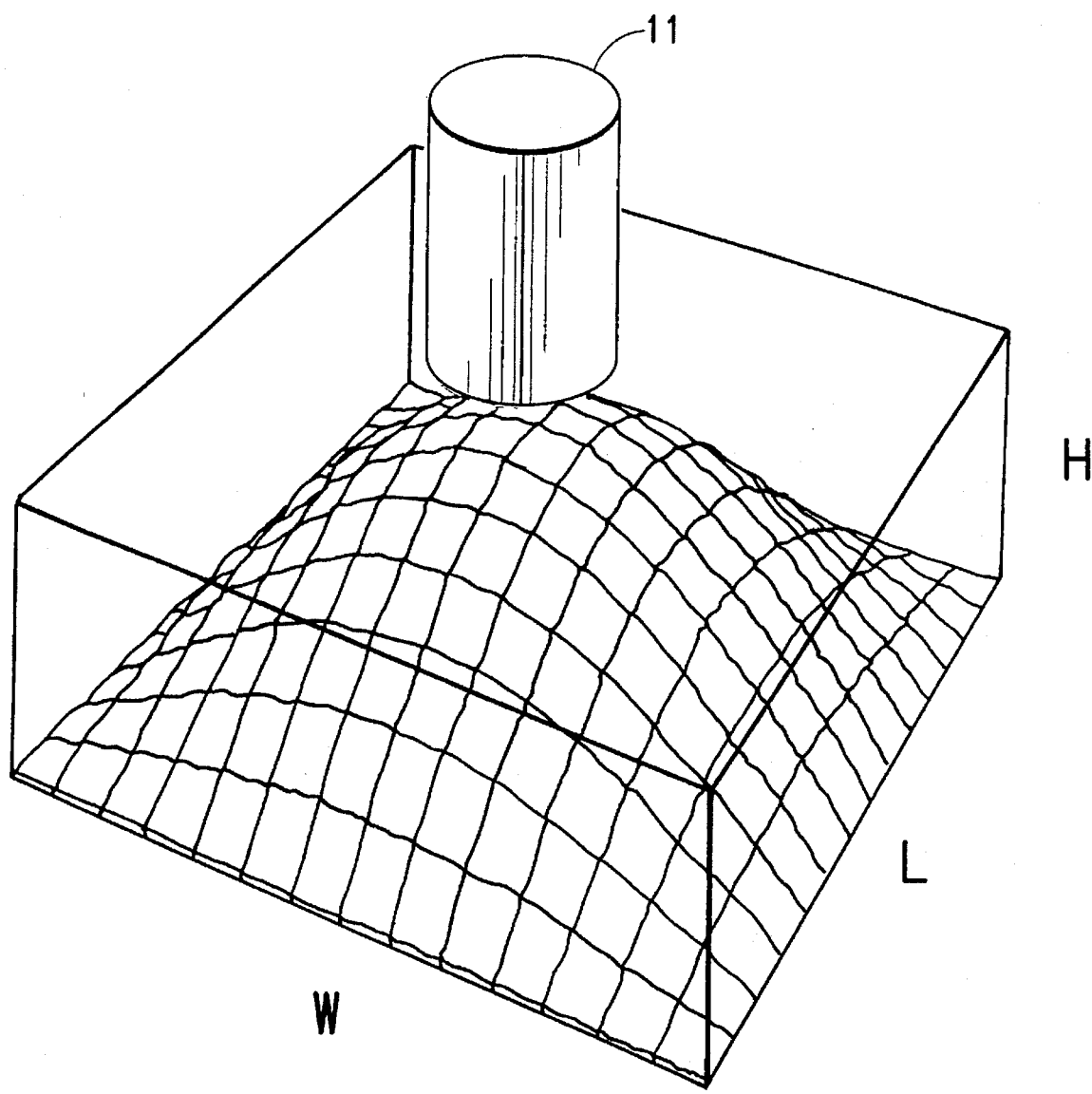
FIG. 1 shows the electric field intensity distribution for a tuned resonate cavity operating in the $TE_{011}$ mode.

Applicator: The assembly containing the reactor vessel, which allows energy input into the catalyst.

Incident Microwave Power, $P_i$: The microwave power in Watts that leaves the microwave generator towards the applicator.

Reflected Microwave Power, $P_r$: The portion of the Incident Microwave Power which is not absorbed into the applicator, and is reflected back towards the generator.

Input Microwave Power, $p_a$: The portion of the Incident Microwave Power which Enters the Applicator.

Useful Microwave Power $P_u$: The portion of Input Microwave Power which actually enters the catalyst and causes heating of the catalyst.

Dissipated Microwave Power $P_d$: The portion of Input Microwave Power which is dissipated directly within the applicator and heats the walls of the applicator. This does not include the power which is radiated in form of visible light or infrared from the heated catalyst.

Radiated Microwave Power $P_{rad}$: The portion of the input Microwave power which leaves the applicator in form of direct microwave radiation, either to open space or through a microwave port other than the entry port.

Cavity: In this case is the applicator, which is made of a rectangular aluminum box with width Length l (x direction), width w (y direction), and Height h (z direction) in Cartesian coordinates.

According to the above definitions, the following equation holds:

$$P_i = P_r + P_a$$

And:

$$P_a = P_u + P_d + P_{rad}$$

Therefore:

$$P_i = P_r + P_u + P_d + P_{rad}$$

One goal of this design has been to maximize the ratio $P_u/P_i$. Therefore the following would have to be minimized: $P_r$, $P_d$, and $P_{rad}$.

The microwave power source has a fixed frequency, for example 2450 MHz. In order to maximize efficiency, (minimize $P_r$ and $P_d$) the applicator system, which includes the cavity and its contents must resonate at the frequency of the microwave source. In order to be able to make this resonance at the specified frequency possible, the dimensions of the cavity, the catalyst bed, the reactor tube, and the electrical properties of all the materials should satisfy the wave equation, which is a derivation of the Maxwell's equation. The wave equation, which is well known in the art, has infinite number of discreet solutions. These solutions in microwave art are called modes, which are associated with number of standing wave repetition within the cavity in each direction. For example, mode $TE_{231}$ means that there are 2, 3 and 1 electric field standing wave patterns along each dimension of a rectangular shaped cavity. For the specific purpose of optimizing this catalytic process, the mode $TE_{011}$ is preferred, and the catalyst column is preferably aligned with the 0 (zero) dimension. The reasons, and advantages gained, are explained below.

The efficiency of a cavity is defined as $P_u/(P_u+P_d)$ (useful power divided by total of useful and dissipated power). It is known that this efficiency is largely proportional to volume integral of electric field within the catalyst to be heated, divided by volume integral of all electric field in the cavity. Therefore, highest efficiency is obtained by choosing the lowest number mode cavity that can fit the catalyst material. The $TE_{011}$ mode is preferred since it is the lowest mode in a rectangular cavity.

FIG. 1. shows a perspective view of the electric field intensity distribution within a cavity for the $TE_{011}$ mode. By placing the cylindrical catalyst column 11 at the maximum of the electric field, several advantages are gained: First, The volume integral of the electric field over the volume of the catalyst is maximized, therefore the efficiency is maximized. Second, all the volume of the catalyst is subjected to a uniform electric field in z direction. Due to slow variation of the field in x-y plane, the fields in that plane are also substantially uniform, and the catalyst is heated uniformly.

In $TE_{011}$ mode, since the z directed mode number is zero, the dimension in this direction, h, can be chosen arbitrarily. This means that the height does not play any role in microwave design and optimization. The height of the heated catalyst bed which is limited by the height of the cavity, h, is critical for conversion yield and catalysis selectivity purposes. This configuration permits the optimization of the height of the cavity purely according to catalysis needs, rather than microwave hardware concerns.

The solution to the wave equation, as described above, determines the width and length dimension of the cavity for resonance at 2450 MHz. The dimensions and the electrical properties of the catalyst also play a role in the outcome. Since the catalyst properties and dimensions vary from experiment to experiment, one of the dimensions of the cavity has been made variable by ±10% by making one of the walls movable. This allows achieving proper resonance for a wide variety of catalysis compositions and dimensions. By making a wall movable, it is possible to optimize the catalyst column size, chemical composition (which affect electrical properties), and catalyst particle size (which also affect bulk electrical properties), so that an optimized catalyst bed can be used, while the microwave heating process is also optimized.

The apparatus is shown in FIG. 2. The reactor tube 1, of ceramic material, is located within a resonate cavity 2, having a movable wall 3, an adjustable coupling window 4, attached to a waveguide 5 by means of a flared waveguide section 6. The waveguide may have multiple stub tuners if desired. The reactor tube 1 has inlet port 8 for bringing gases to the catalyst, and outlet port 9 to remove product. The reactor tube is adapted to contain catalyst 7. Particulate catalyst may be maintained in the tube by screens or gauze or quartz fiber retainers. In the embodiment shown the movable wall 3 has an attached rod 10 for manually moving the wall to the tuned position. The walls of the resonate cavity are preferably made of aluminum.

FIG. 2 shows the general arrangement of the catalysis system. It is known in microwave art, that when the material to be heated, in this case the catalyst, is high in microwave susceptibility, some non-uniformity in heating is experienced at the areas close to the feed point of the microwaves. This feed-point non-uniformity has been eliminated by flaring a section of the waveguide adjacent to the cavity.

FIG. 2 shows a perspective view of the apparatus. A cavity resonator, in this case rectangular, resonates in $TE_{011}$ mode at the frequency of the microwave source. The adjustment of the moving wall changes the resonant frequency, so that the cavity wall becomes tuned to the frequency of the microwave source with the presence of the catalyst. A combination of cavity dimensions, the location of the moving wall, and the type and amount of catalyst determine the resonant frequency. The moving wall provides flexibility for the user to assure that the cavity is tuned to the frequency of the source.

Due to the nature of $TE_{011}$ mode, the resonant frequency of the cavity is independent of cavity height. Therefore the designer of the cavity is free to make the height suitable for the residence time required for the chemical reaction and the amount of catalyst.

The width of the coupling window 4 is designed such that the maximum amount of available power enters the cavity, and the minimum amount is reflected back to the source. The purpose of the flared section between the window and the standard waveguide is to provide smooth transition, as well as keeping the height of the window equal to the cavity height. This will provide uniform coupling of power to the whole height of the cavity.

The reactor tube, which may be made of an insulating material, is located substantially at the center of the cavity. This location is chosen so that the tube will be nearly equidistant from the fixed and movable side walls as the movable wall position is varied. In $TE_{011}$ mode the electric field is in the direction of the tube, and is maximum at the center of the cavity side which is perpendicular to the reaction tube.

The catalyst, which can be in the form of powder, flakes, pellets, or granules, can make a column which is either as high as the cavity height or shorter. The catalyst material should be such that in addition to proper catalytic properties, it should have high microwave loss factor. Most metal powders on a variety of supports have such properties. Gases do not interact with microwaves, therefore the only material limitations from a microwave standpoint are the catalyst and the reactor tube. The catalyst in order to have a high microwave loss factor should contain at least about 0.1% to about 20% by weight platinum-group-metal, and preferably about 0.2 to about 10% by weight. A preferred metal is platinum.

The process of the invention operates at atmospheric pressure or above, i.e. the total pressure in the reactor is at least atmospheric. Pressures as high as 5 atmospheres are satisfactory. The process of the invention is operated under a pressure high enough, and at an electric field intensity low enough that plasma is not formed.

In a preferred embodiment the microwave energy is applied in pulses.

In operation the reactor tube is loaded with a catalyst, for example a platinum-group-metal catalyst and the movable wall adjusted so that the microwave power will form a single mode at the reactor tube. The coupling window also is adjusted so that a minimum of microwave energy is reflected back into the waveguide. The reaction tube will normally be at about the mid-point between the movable wall and the coupling window. Sufficient power is applied to raise the temperature of the catalyst to reaction temperature: in the case of HCN manufacture to at least 1000 degrees C., and the flow of reactants begun: when the apparatus is used for making HCN, the reactants will be ammonia vapor and hydrocarbon gas, and the mole ratio of ammonia to carbon atoms contained in hydrocarbon gas will be about 1 to 1. Suitable hydrocarbon gas is one having 1 to 6 carbon atoms. Mixtures of such gases may also be used. Methane is the preferred gas.

The process will operate at its maximum efficiency if the microwave energy is supplied in pulses; thus maintaining the catalyst at reaction temperature, but not far in excess of the reaction temperature.

EXAMPLES

CONTINUOUS HEATING

A 12 mm O.D. quartz tube reactor was inserted through the rectangular single-mode cavity (I.D.=3.4×7.2 cm) described above which served to direct the microwave (radio frequency RF) energy into the catalyst. The chamber around the quartz tube was packed with high temperature ceramic insulation to reduce heat loss to the surroundings. The quartz reactor and ceramic insulation were selected because they do not significantly absorb RF energy. The RF source was a commercially available 0–1500 W, 2.45 GHz generator connected to the tunable cavity by rectangular waveguide. The energy input to the cavity was the difference between the forward and reflected energy measurements made using a directional coupler between the generator and the cavity.

A 10% Pt/gamma-alumina catalyst was prepared by impregnating Engelhard 646-1 gamma-alumina with Pt 2-ethylhexanoate in toluene solution, drying under $N_2$ at 110 degrees C. and 130 degrees C., reducing under $H_2$ at 130 degrees C., and drying under $N_2$ at 500 degrees C. for 16 hrs. Sufficient catalyst to fill the height of the cavity (about 20 g, as placed in the quartz tube and ammonia and methane flows were started in a 1:1 ratio with a total flow rate of 23 mL/min. The RF generator was then turned on and the RF power and gas flow rates were varied for several hours while keeping the cavity tuned to optimize power absorption by the catalyst. Gas chromatography (GC) analysis of the products exiting the reactor showed that steady state was reached within about 20 minutes after a change in conditions. The catalyst was tested for more than 20 hrs over a four day period using total flow rates of 20–45 mL/min at power inputs of 50–400 watts. Results with total feed rate of 30 mL/min and power input of 340 watts are shown in Table 1.

TABLE 1

Product Composition
1:1 $NH_3$:$CH_4$ feed rate = 30 mL/min, power input = 340 watts

|  | Vol. % |
|---|---|
| Hydrogen | 71.4 |
| Nitrogen | 0.8 |
| Methane | 0.5 |
| Ammonia | 3.4 |
| Hydrogen Cyanide | 23.2 |
| HCN Selectivity | 93% |
| $NH_3$ and $CH_4$ conversions | >93% |

HCN selectivity is defined as: (moles HCN produced)/ (moles HCN produced +2 moles N2 produced). The significant change in moles due to reaction was accounted for in the methane and ammonia conversions.

Example 2: Pulsed Heating compared to Continuous heating

Similar catalytic performance has been demonstrated using pulsed microwave energy with improved energy efficiency and lower bulk catalyst temperature.

A fresh sample of the same catalyst used in the continuous heating example (Example 1 above) was placed in a new 12 mm diameter quartz tube. The tube was then inserted into the same microwave cavity described above and wrapped in ceramic insulation to reduce heat loss due to radiation. A pulse generator and a digital delay generator were added to the power supply allowing the microwave source to be pulsed. The methane and ammonia flows were started in a 1:1 ratio at a total flow rate of 60 mL/min. Two runs were made: Run A with continuous heating and Run B with pulsed heating. Both runs were conducted at 150 watts power, but in the pulsed run the power was pulsed at 0.5 seconds on and 0.5 seconds off. The residence time of the gas in the heated section of the reactor was about 2 seconds. The average power input to the catalyst was 150 W under continuous heating and only 75 W under pulsed heating. The GC results for the two examples are shown in Table 2.

TABLE 2

Product Composition for Examples
1:1 $NH_3$:$CH_4$ feed rate = 60 mL/min, 150 W

|  | Run A | Run B |
|---|---|---|
| Product |  |  |
| Hydrogen | 72.8 | 55.3 |
| Nitrogen | 1.0 | 0.9 |
| Methane | 6.4 | 18.6 |
| Ammonia | 1.2 | 6.1 |
| Hydrogen Cyanide | 18.7 | 19.2 |
| HCN Selectivity | 91% | 91% |
| $NH_3$ and $CH_4$ conversions | >88% | >68% |
| Average power input | 150 W | 75 W |
| kWhr/lb HCN | 47 | 23 |
| Gas temperature degrees C.* | 60 | 41 |

*Gas temperature as measured by thermocouple placed about 6 inches after reactor. This relates to catalyst temperature, however bulk catalyst temperature was not measured in this experiment. Visual observations of the glowing catalyst indicate that the catalyst was significantly cooler when the power was pulsed.

These examples illustrate the benefits of pulsed microwave heating in terms of energy efficiency (47 VS. 23 kWhr/lb HCN, catalyst temperature (60 vs 41 degrees C.) and were not intended to illustrate optimum catalytic performance (at equal conversions, pulsing still requires lower kWhr/lb HCN than continuous heating). More of the energy input is going to reaction and less to radiation losses when the power is pulsed.

What is claimed is:

1. A process for the preparation of hydrogen cyanide which comprises passing a mixture of ammonia vapor and a hydrocarbon gas at a pressure at least equal to atmospheric pressure in contact with a platinum-group-metal catalyst containing 0.1 to 20% by weight platinum-group-metal, while subjecting the catalyst to single mode microwave heating to raise the temperature of the catalyst to reaction temperature, and recovering hydrogen cyanide.

2. The process of claim 1 in which the hydrocarbon gas is methane, the mole ratio of methane to ammonia is approximately 1, and the single mode of microwave heating is $TE_{011}$.

3. The process of claim 1 in which the platinum-group-metal catalyst is dispersed in a porous oxide substrate.

4. The process of claim 3 in which the porous oxide substrate is aluminum oxide.

5. The process of claim 1 in which the single mode microwave heating is produced by intermittent pulses of microwave energy.

6. The process of claim 1 in which the metal of the platinum-group-metal catalyst is platinum.

7. The process of claim 2 in which the platinum-group-metal catalyst is a metal gauze containing a platinum-group-metal.

8. The process of claim 1 in which the reaction temperature is about 1000 degrees C.

9. The process of claim 1 in which the catalyst contains 0.2 to 10% by weight platinum-group-metal.

10. A process for the preparation of hydrogen cyanide which comprises passing a mixture of ammonia vapor and a hydrocarbon gas at a pressure at least equal to atmospheric pressure through a tubular reactor containing a platinum-group-metal catalyst having 0.1 to 20% by weight platinum-group-metal, where the ammonia vapor and hydrocarbon gas contact said catalyst while subjecting the catalyst to single mode microwave heating to raise the temperature of the catalyst to reaction temperature, and recovering hydrogen cyanide, said tubular reactor extending through a resonant cavity.

* * * * *